United States Patent Office 3,347,657
Patented Oct. 17, 1967

3,347,657
HERBICIDAL COMPOSITIONS CONTAINING 2-METHYLTHIO - 4 - (γ - METHOXYPROPYL-AMINO)-6-ISOPROPYLAMINO-s-TRIAZINE
Enrico Knusli, Riehen, and Hans Gysin, Basel, Switzerland, assignors to J. R. Geigy A.-G., Basel, Switzerland
No Drawing. Continuation of application Ser. No. 377,447, May 28, 1964, which is a division of application Ser. No. 330,582, Dec. 6, 1963. This application July 26, 1966, Ser. No. 568,060
2 Claims. (Cl. 71—93)

ABSTRACT OF THE DISCLOSURE

Herbicidal compositions which contain 2-methylthio-4-(γ-methoxy - propylamino)-6-isopropylamino-s-triazine, as active ingredient, possess the power to kill very tenacious weeds, such as camomile, vetch or, especially, blackgrass in wheat fields, when applied in amounts which do not damage the wheat.

---

The present application is a continuation of copending application Ser. No. 377,447, filed May 28, 1964, which is a division of application Ser. No. 330,582, filed Dec. 6, 1963, which in turn is a continuation-in-part of application Ser. No. 848,224, filed Oct. 23, 1959 (all said prior applications being now abandoned).

The present invention concerns the use of new compositions containing triazine derivatives having valuable herbicidal properties, for the inhibition of plant growth.

More especially it relates to the use of new compositions containing 2-methylthio-s-triazines as active ingredients in weed control agents in wheat and the like cereal cultures for combating certain more recently spreading "mono"-weeds in such cultures. The invention further relates to a method of controlling weeds in wheat, rye, barley, millet, corn and the like cereal fields with the aid of these new triazine-containing compositions.

Whether a herbicide is useful in combating weeds in cultivated fields depends upon a variety of factors.

Firstly, the herbicide must be free from phytotoxic effects on the cultivated plants in the field when applied in amounts which kill the majority of the weeds.

Secondly, the ratio between the toxicity limit above which substantial damage to the crop would occur, and the minimum amount at which sufficient herbicidal effect is achieved, must be a large one in order to provide a safety margin taking into account climatic factors (rain etc.) which may increase the active concentration of the herbicide in the soil in an unpredictable manner and also frequently occurring double spraying etc. at overlapping areas of treatment.

Thus, in the case of 2-chloro-4,6-bis-ethylamino-s-triazine, that ratio is relatively small as far as application in wheat, rye or barley fields is concerned, wherefore the use of Simazine in such fields is dependent upon stable weather conditions.

Thirdly, and especially in the treatment of fields of the aforesaid cereals, it should be possible to apply larger concentrations of the herbicide in the pre-emergence period (late winter or early spring in the case of winter cereals, and early spring in the case of summer cereals), in order to build up a reserve of herbicide in the soil large enough to affect those weeds which are particularly tenacious and especially also those which have a late germination period (April to June in the northern hemisphere).

Among these tenacious weeds occurring in wheat and the like cereal crops there are two kinds especially distinguishable namely, broad-leaved weeds and grass-like weeds.

The intense use of 2,4-dichloro-phenoxyacetic acid-type hormone preparations has achieved successful suppression of the growth of broad-leaved weeds in wheat and the like fields.

This, however, increases the chances for the survival of the grass-type weeds. The latter type of weeds has been combated in the past with such well-known triazine derivatives as 2 - chloro - 4,6 - bis - ethylamino-s-triazine (Simazine) and 2 - chloro - 4 - ethylamino-6-isopropyl-amino-s-triazine (Atrazine), but their use is limited by the fact that, while they are readily applicable in larger concentrations in corn fields, the toxicity limit of these herbicides in wheat, rye or barley fields is at about 300 to 600 grams (g.) per hectare (ha.), while their minimum amount for fully successful killing of the last-mentioned type of weeds is in the order of 350 to 400 g./ha., i.e. the above-mentioned safety ratio is too narrow for assuring satisfactory herbicidal action and at the same time guaranteeing undamaged crops.

In fact, the last mentioned dosages are usually not sufficient to seriously affect weeds pertaining to such families as Gramineae, Compositae, Rubiaceae, Rosaceae, Ranunculaceae and Convolvulaceae.

Moreover, the past treatment of fields of wheat, rye, barley, oats, corn and the like cereals especially with hormonal agents has furthered the development of certain "mono"-weeds in these fields which are particularly pertinacious so that there is now an urgent need for new herbicides capable of killing these more recently spreading weeds, among which there are especially black grass (*Alopecurus myosuroides*), brome grass (*Bromus tectorum*), witch weed (*Striga asiatica*) and others.

As a fourth requirement of an ideal herbicide for use in wheat and the like cereal fields, there is the timely reduction of herbicidal activity in the soil after the harvesting of crop which had been protected by the herbicide, which reduction or termination of herbicidal activity is of special importance in case of crop rotation, where, for instance, a wheat crop is to be succeeded by a sugar crop, it being well known that sugar beet plants are particularly sensitive to herbicides.

It is therefore the main object of this invention to provide a herbicide which satisfies all the above-listed requirements, in that it has a wide tolerance span, that is (a) it can be applied in at least two or more times the amount required for a satisfactory killing of the weeds in wheat and the like cereal crops without showing any noteworthy damage to the crops;
(b) it can be applied during the pre-emergence period in such amounts and has such residual effect that it will satisfactorily combat late-germinating weeds in the said type of crops,
(c) it has a particularly low dosage limit for obtaining satisfactory kill of the above-mentioned more recently spreading mono-weeds;
(d) its residual effect does not extend so far beyond the harvesting of the crop which is to be protected as to adversely affect a subsequent, more sensitive crop.

We have found that, surprisingly, this object is attained by using, as herbicide for the control of weeds in wheat and the like cereal fields, a 2-methylthio-s-triazine of the formula

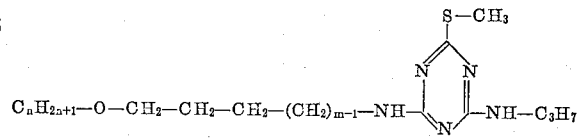

(I)

wherein each of $m$ and $n$ is an integer ranging from 1 to 2; these compounds can be applied to wheat and the like cereal fields in amounts of up to 3 to 5 kilograms per hectare in pre-emergence as well as post-emergence treatment without damaging the crop, and have a large tolerance span, since application of only about 400 grams per hectare of, for instance 2-methylthio-4-(γ-methoxy-propyl)-amino-6-isopropylamino - s - triazine practically eliminates black grass. Up to 3.3 kilograms of the last-mentioned compound and even 5 kilograms of 2-methyl-thio-4-(γ-methoxy-propyl)-amino - 6 - n - propylamino-s-triazine both falling under Formula I, can be applied per hectare, for instance of a winter-wheat field, without damaging the crop. On the contrary an increase of the harvested amount of grain is usually obtained over that produced from untreated areas.

Moreover, herbicidal compositions containing the compounds of Formula I, and in particular 2-methylthio-4-(γ - methoxy - propylamino)-6-isopropylamino-s-triazine, possess all of the advantages which have been enumerated as desirable hereinbefore.

This is particularly unexpected, since structurally related s-triazines do not possess properties that would have led one to expect the above-described advantageous combination of properties from the compounds of Formula I. Thus, about twice the amount of 2-methylthio-bis-[(γ-methoxy-propyl)-amino]-s-triazine is required when used alone in the control of weeds in wheat and the like fields to achieve a weed control effect similar to that of a given amount of 2-methylthio-4-(γ-methoxy-propylamino)-6-isopropyl-amino-s-triazine; yet, already 2-kilograms per hectare of the former compound inflict about 25% damage, while 3 kg./ha. therefore may kill half the stand of winter wheat.

On the other hand, 2-methylthio-bis-(isopropylamino)-s-triazine, which kills, for instance, black weed at about the same concentration as 2-methylthio-4-(γ-methoxy-propylamino)-6-isopropylamino-s-triazine, can be applied only in concentrations of 1 to 2 kg./ha. to winter wheat without damaging the stand of the crop. And 2-methoxy-4 - (γ - methoxy - propylamino) - 6 - isopropylamino - s-triazine, which differs from the last mentioned compound only by the presence of an oxygen in lieu of a sulfur atom, fails completely as a herbicide in wheat and the like cultures for it is more phytotoxic, for instance, to winter wheat itself than it is to the principal weeds growing in the fields of that cereal.

Of course, the compounds of Formula I are also suitable both for the selective killing of weeds among the cultivated plants, in particular peanuts and cotton, and for the killing of weeds on uncultivated ground such as that of industrial plants, or railway lines or paths.

To produce the new compounds defined above, triazine derivatives of the general formula

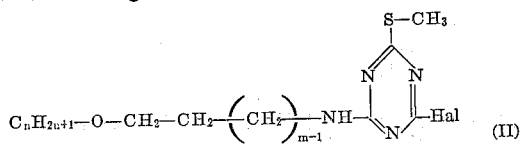
(II)

wherein Hal represents chlorine or bromine and $m$ and $n$ have the meanings given hereinbefore, are reacted with one mole of an amine of the formula $C_3H_7-NH_2$ i.e., either with n-propylamine or isopropylamine, or triazines of the general formula

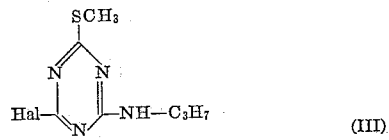
(III)

wherein Hal has the same meanings as above are reacted with one mole of an amine of the general formula $C_nH_{2n+1}-O-CH_2-CH_2-(CH_2)_{m-1}-NH_2$ (IV)

wherein $m$ and $n$ have the meanings given hereinbefore, i.e. with 3-methoxy- or 3-ethoxy-propylamine or with 2-methoxy- or 2-ethoxy-ethylamine, both the above reactions being carried out in the presence of an acid binding agent and/or in the presence of an excess of the amine serving in this case as acid binding agent. Advantageously the excess is about one mole of the amine.

Aqueous solutions of alkali hydroxides or alkali carbonates are preferably used as acid binding agents.

Compounds of the general Formula I are also obtained by reacting a triazine derivative of the general formula

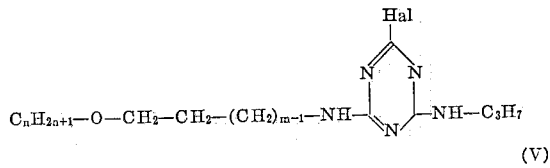
(V)

wherein $m$ and $n$ have the above-defined meanings, with an alkali metal compound of methyl mercaptan.

This reaction can be performed, for example in an excess of the mercaptan at a raised temperature, or at the boiling temperature of the mercaptan. The reaction can be carried out also in suitable inert organic solvents such as, e.g. hydrocarbons of the benzene series.

Finally, compounds of the general Formula I can also be produced by reacting alkali metal salts of triazine derivatives of the general formula

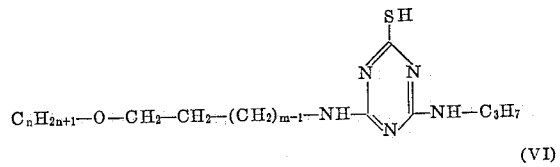
(VI)

wherein $m$ and $n$ have the meanings given hereinbefore, with methylbromide or dimethylsulfate or the like reactive methyl ester.

The following triazine derivative is an example of a starting material of the general Formula II: 2-chloro-4-methylmercapto-6-(γ-methoxy-propylamino)-s-triazine.

Starting materials of the general Formula III are, for example:

2 - chloro - 4 - methylmercapto - 6 - isopropylamino - s-triazine and 2-chloro-4-methylmercapto-6-n-propylamino-s-triazine, 2 - mercapto - 4 - isopropylamino - 6 - (β - methoxy-ethylamino)-s-triazine, 2 - mercapto - 4 - isopropylamino - 6 - (γ - methoxy-propylamino)-s-triazine and 2 - mercapto - 4 - n - propylamino - 6 - (γ - methoxy-propylamino)-s-triazine are suitable, for example, as compounds of Formula VI.

The alkali metal salts of which can be reacted, for example, with methyl chloride, methyl bromide, dimethyl sulfate or the like reactive methyl esters.

The following non-limitative examples further illustrate the production of the active ingredients used in the invention. Therein, parts and percentages are always given by weight and the temperatures are in degrees centigrade.

*Example 1*

46 parts of cyanuric chloride are dissolved in 300 parts of chlorobenzene. Then, at −15° to −5°, first 14 parts of isopropylamine dissolved in 22 parts of water and then 10 parts of sodium hydroxide dissolved in 40 parts of water are added dropwise. The whole is stirred until the reaction mixture has a neutral reaction, any traces or precipitated 2-chloro-4,6-bis-isopropylamino-s-triazine are removed and then, at room temperature, 23 parts of γ-methoxy-propylamine in 46 parts of water and afterwards 10 parts of sodium hydroxide in 40 parts of water are added. The whole is stirred at 40–50° until the reaction mixture has a neutral reaction. The chlorobenzene is eliminated by steam distillation whereupon the difficultly soluble 2-chloro-4-isopropylamino-6-(γ-methoxy-propylamino)-s-triazine can be filtered off under suction and recrystallised. M.P. 112–114°.

The two primary amines can also be added in reverse order.

The auxiliary solvent named, chlorobenzene, can be replaced by similar solvents such as benzene and toluene. It is also possible, however, to prepare a finely granular aqueous suspension of cyanuric chloride without such an auxiliary solvent.

The following compounds can be produced in an analogous manner:

2-chloro-4-isopropylamino-6-(β-methoxy-ethylamino)-s-triazine,
2-chloro-4-isopropylamino-6-(β-ethoxy-ethylamino)-s-triazine,
2-bromo-4-isopropylamino-6-(β-methoxy-ethylamino)-s-triazine,
2-bromo-4-isopropylamino-6-(γ-methoxy-propylamino)-s-triazine,
2-chloro-4-n-propylamino-6-(γ-methoxy-propylamino)-s-triazine.

*Example 2*

In accordance with the method described by Klason in Journal fur praktische Chemie (2), 33, page 296 (1886), 26 parts of 2-chloro-4-isopropyl-amino-6-(γ-methoxy-propyl-amino)-s-triazine are admixed with 100 parts of concentrated aqueous potassium hydrosulfide solution and stirred until a practically clear solution is obtained. The mixture is then neutralized with acetic acid whereby precipitation of the resulting 2-mercapto-4-isopropylamino - 6 - (γ-methoxy-propylamino)-s-triazine occurs. The crystalline product is separated by filtration and washed with cold water. This product can then be directly converted to the corresponding 2-methylthio derivative as described in the following example.

In an analogous manner the other 2-chloro-s-triazines and 2-bromo-s-triazines obtained as described in Example 1 are converted to the corresponding 2-mercapto-s-triazines, namely:

2-mercapto-4-isopropylamino-6-(β-methoxy-ethylamino)-s-triazine,
2-mercapto-4-isopropylamino-6-(β-ethoxy-ethylamino)-s-triazine,
2-mercapto-4-isopropylamino-6-(β-methoxy-ethylamino)-s-triazine,
2-mercapto-4-isopropylamino-6-(γ-methoxy-propyl-amino)-s-triazine,
2-mercapto-4-n-propylamino-6-(γ-methoxy-propyl-amino)-s-triazine.

*Example 3*

2.3 parts of sodium are dissolved in 200 parts of anhydrous methanol and then 25.7 parts of 2-mercapto-4-isopropylamino-6-(γ-methoxy-propylamino)-s-triazine are added. 20 parts of methyl iodide are then added dropwise and the reaction mixture is stirred at 40–50° until it has a neutral reaction. The solvent is then distilled off, the residue is taken up in benzene, the solution is washed with 2 N-caustic soda lye and with water, the benzene is eliminated and the 2-methylmercapto-4-isopropylamino-6-(γ-methoxy-propylamino)-s-triazine is recrystallised from petroleum ether. M.P. 68–70°.

In an analogous manner, the other 2-mercapto-s-triazines described in Example 2 are converted to the corresponding 2-methylthio-s-triazines, namely:

2-methylthio-4-isopropylamino-6-(β-methoxy-ethyl-amino)-s-triazine and
2-methylthio-4-n-propylamino-6-(β-ethoxy-ethylamino)-s-triazine.

The compounds named above as well as others of the general Formula I defined above are excellently suitable as active ingredients for weed killers, especially for the selective control of weeds among the above described cultivated plants. By weeds are meant here also undesired cultivated plants, for example, those from a previous crop.

The weed killers according to the invention can be used in the form of solutions, emulsions, suspensions, pastes, dusts or granules. All forms of application, however, must ensure that the active ingredient is contained in a finely distributable form. In particular, when used for the total destruction of plant growth, early desiccation as well as defoliation, the action can be increased by the use of carriers having a phytotoxic action such as, e.g. high boiling mineral oil fractions; on the other hand, the selectivity of the inhibitory action, e.g. in selective weed killing, is generally better attained by using carriers which are inert to plants.

In particular higher boiling organic liquids such as mineral oil fractions, coal tar oils as well as also vegetable and animal oils are used for the production of solutions. In order to more easily dissolve the active ingredients in these liquids, possibly slight amounts of organic liquids having better dissolving powers and generally a lower boiling point can be added, i.e. solvents such as alcohols, e.g. ethanol or isopropanol, ketones, e.g. acetone, butanone or cyclohexanone, diacetone alcohol, cyclic hydrocarbons e.g. benzene, toluene or xylene, chlorinated hydrocarbons, e.g. tetrachlorethane or ethylene chloride or mixtures of such substances.

The aqueous forms of application are chiefly emulsions and dispersions. The substances are homogenised in water either as such or in one of the solvents named above, with the aid of surface active emulsifying or dispersing agents. Cation active emulsifying agents are e.g. quaternary ammonium compounds and alkyl polyoxyethylene amines such as Katapol PN–430 of Antara Chemicals. Anion active emulsifying and dispersing agents comprise soaps, soft soaps, salts of alkylaryl sulfonates such as Nekal BX–78 of Antara Chemicals, Ninate 402 of Ninol Laboratories Inc., Sellogen HR of Jacques Wolf & Co., Tinovetin B of J. R. Geigy A.G., salts of fatty alcohol sulfonates such as Duponol L 144–WDG of E. I. du Pont de Nemours & Co., salts of sulfonates of vegetable or animal oils, and complex sulfonate such as Emcol H–A, H–B and H–C of Emulsol Chemical Corp. Nonionic emulsifying agents are, e.g. polyethylene glycol ethers of alkylphenols and other polyethers such as Triton X–100 of Rohm & Haas Co., Agrimul 70A and 70B of Nopco Chemicals Co., polyethylene glycol esters of fatty acids such as Nonisol 100 and Nonisol 200 of Geigy Chemical Corp. and Emulsan O and Emulsan K of Reilly-Whiteman-Walton Co., polyoxyethylene sorbitan esters of fatty acids used together with corresponding sorbitan esters such as Tween 60 together with Span 60 of Atlas Powder Co. Anionic agents are used in many cases advantageously in combination with nonionic agents or use is made of commercial blends of anionic and nonionic agents such as Toximul 500 of Ninol Laboratories, Agrimul GA of Nopco Chemical Co., Emcol H 400, H 500, H 600, H 700 or H 800 of Emulsol Chemical Corp., HS–31 Emulsifier of Thompson Chemicals Corp. or T–H Emulsifiers of Thompson-Hayward Chemical Co. Liquid or pasty concentrates suitable for dilution with water comprise a herbicidal substance according to the invention, an emulsifying or dispersing agent and, possibly, a solvent as mentioned above.

Dusts and sprinkling agents can be produced by mixing or milling the active ingredient with a solid carrier. Such carriers are: talcum, diatomaceous earth, kaolin, bentonite, calcium carbonate, tricalcium phosphate, sand, or also sawdust, ground cork, and other materials of vegetable origin. On the other hand, the carriers can also be impregnated with solutions of the active ingredients in a volatile solvent and evaporating the latter. By the addition of surface active agents, e.g. the emulsifying agents mentioned above, and protective colloids, e.g. sulphite waste liquor, pulverulent preparations and pastes can be made suspendable in water and used as sprays.

The various forms for application can be more closely adapted to the intended use in the usual way by the addition of substances which improve or decrease the distribution and penetration into the ground depending on the depth of roots of the weeds to be destroyed. The biological effect can be widened by the addition of substances having bactericidal or fungicidal properties, for example, for the attainment of a general earth sterilisation or, in selective weed killing, for the protection of cultivated plants from other injurious organisms.

A combination with fertilisers is labour-saving and can favor the action of the herbicide.

The amounts of active ingredients necessary per hectare vary in selective weed killing dependent on the sensitivity of the weeds, the resistance of the cultivated plants, the time of application, climatic conditions and the condition of the ground; between about 0.2 to 2 kilograms per hectare should be used. As has been explained above, the above amounts can also be exceeded and up to 3 to 5 kilograms/ha. can be applied in cereal fields, especially in pre-emergence application. Depending on the season of the year, the climatic conditions of the region, and the type of soil, the maximum applicable amount of the herbicides according to the invention varies, but does not exceed, in practical cases, 8 kg./ha.

Example 4

10 parts of 2-methylthio-4-isopropylamino-6-(γ-methoxy-propylamino)-s-triazine and 90 parts of talcum are ground in a ball mill, a pin beater mill or another suitable mill. The mixture obtained serves as a herbicidal dust for the purposes set forth hereinbefore.

Example 5

20 parts of 2-methylthio-4-isopropylamino-6-(γ-methoxy-propylamino)-s-triazine, are dissolved in a mixture of 48 parts of diacetone alcohol, 16 parts of xylene and 16 parts of an anhydrous polyethylene glycol ester of higher fatty acids. This concentrate can be diluted with water to form herbicidally active emulsions of any concentration desired.

Example 6

50–80 parts of 2-methylthio-4-isopropylamino-6-(γ-methoxy-propylamino)-s-triazine are mixed with 2–5 parts of a wetting agent, e.g. a sulfuric acid ester of an alkyl polyethylene glycol ether, 1 to 5 parts of protective colloid, e.g. sulphite waste liquor and 14 to 44 parts of an inert solid carrier such as, e.g. kaolin, bentonite, chalk or kieselguhr and the mixture is then finely milled in a suitable mill. The wettable powder obtained can be stirred up with water and produces very stable suspensions.

Example 7

10 parts of 2-methylthio-4-isopropylamino-6-(γ-methoxy-propylamino)-s-triazine are dissolved in 60 to 80 parts of a high boiling organic liquid such as, e.g. coal tar oil, diesel oil or spindle oil to which 30 to 10 parts respectively, of xylene have been added. It can be used as a herbicidal spray for the purposes set forth hereinbefore.

Example 8

5 to 10 parts of 2-methylthio-4-isopropylamino-6-(γ-methoxy-propylamino)-s-triazine, are mixed and milled with 95–90 parts of calcium carbonate (=ground limestone). The product can be used as a strewing agent for the purposes set forth above.

Example 9

95 parts of a granular carrier, e.g. sand or calcium carbonate are moistened with 1 to 5 parts of water, isopropanol or polyethylene glycol and then 5 parts of the active ingredient used in Example 5, are mixed in.

A greater amount, e.g. 100 to 900 parts of a preferably water-soluble fertiliser such as, e.g. ammonium sulfate or urea, can be mixed with the above mixture or with one containing more active ingredient, e.g. 10 parts of the active ingredient and 90 parts of calcium carbonate. The granulates obtained can be strewed on to fields planted with wheat as a pre-emergence treatment as mentioned hereinbefore.

Example 10

50 parts of 2-methylthio-4-isopropylamino-6-(β-methoxy-ethylamino)-s-triazine, are added to 45 parts of xylene and the whole is combined with 5 parts of Toximul 500. A concentrate for the preparation of emulsions which in water can be emulsified in any ratio desired, is obtained.

What is claimed is:

1. A herbicidal composition for the control of tenacious weeds in wheat fields, consisting essentially of
  (a) 1 part by weight of a compound of the formula

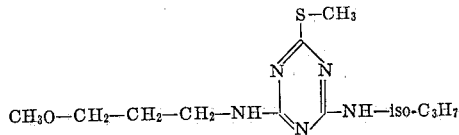

and
  (b) about 0.5 to 99 parts by weight of an agriculturally acceptable, non-herbicidal carrier.

2. A method of controlling the growth of blackgrass and broad-leaved tenacious weeds in wheat fields, comprising applying to the wheat field to be controlled per hectare at least about 400 grams but not more than that amount which would substantially affect the harvest yield of the cereal crop resulting from that field, of a compound of the formula

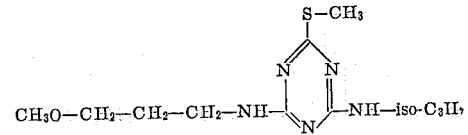

References Cited

UNITED STATES PATENTS

| | | | |
|---|---|---|---|
| 3,037,853 | 6/1962 | Luckenbaugh | 71—2.5 |
| 3,152,882 | 10/1964 | Luckenbaugh | 71—2.5 |
| 3,185,561 | 5/1965 | Acker | 71—2.5 |
| 3,190,740 | 6/1965 | Wolter | 71—2.6 X |
| 3,207,756 | 9/1965 | Knusli et al. | 71—2.5 |

LEWIS GOTTS, *Primary Examiner.*

JAMES O. THOMAS, Jr., *Examiner.*